United States Patent
Davitt et al.

(10) Patent No.: US 6,463,139 B1
(45) Date of Patent: *Oct. 8, 2002

(54) COMBINATION PRE-PAID AND CALLING CARD

(75) Inventors: Michael Davitt, Basking Ridge; Louis N. Delery, Lebanon; Leonard Matulewski, Andover, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/645,126

(22) Filed: Aug. 24, 2000

Related U.S. Application Data

(63) Continuation of application No. 09/080,534, filed on May 18, 1998, now Pat. No. 6,137,872.

(51) Int. Cl.$^7$ ............................................. H04M 17/00
(52) U.S. Cl. ........................ 379/144.01; 379/114.16; 379/114.17; 379/114.2; 379/114.22; 455/406
(58) Field of Search ........................... 379/111–115.02, 379/120, 121.01, 121.03, 124, 127.01, 127.02, 127.04, 133–134, 144.01–145, 188–189, 201

(56) References Cited

U.S. PATENT DOCUMENTS 5,854,975 A 12/1998 Fourgnies et al.
6,137,872 A * 10/2000 Davitt et al.

* cited by examiner

*Primary Examiner*—Duc Nguyen

(57) ABSTRACT

Subscribers ($12_1$–$12_n$) may receive combined pre-paid and calling card service offered via a telecommunications network (20) by dialing a telephone number (32) of a platform (26) within the network. The platform stores account information for each subscriber, including a pre-paid balance amount and overflow treatment indicator. Upon receipt of a call, the platform verifies the subscriber's eligibility for service and provides the service while decrementing the subscriber's pre-paid balance. When the subscriber's pre-paid balance falls below a prescribed value, the platform determines whether the subscriber is entitled to automatic billing of continuing service costs or whether the subscriber must enter information to facilitate billing of such costs based on the overflow indicator. Thereafter, the platform effects continuing call treatment and billing for such continuing call treatment when effected billing in accordance with the overflow indicator.

17 Claims, 2 Drawing Sheets

COMBINATION PRE-PAID AND CALLING CARD

This application is a continuation of U.S. patent application Ser. No. 09/080,534, filed May 18, 1998.

TECHNICAL FIELD

This invention relates to a technique for billing the telecommunications cost incurred by a subscriber.

BACKGROUND ART

Presently, telecommunications services providers that offer inter-exchange toll call service, as well regional toll call service, typically charge the subscriber making such calls charged by billing the subscriber's residence or business from which the calls originated. In some instances, a subscriber may wish to originate calls from other locations yet not have the cost for such calls to the originating number. To accommodate that need, some telecommunications service providers, such as AT&T offer calling card service whereby a subscriber can charge the cost of a call to a calling card account. In practice, telecommunications service providers offering calling card service combine the calling card charges with the other call charges billed to the subscriber's residence or business. Alternatively, the telecommunication service provider may render a separate bill for such calling card charges. As a convenience, some telecommunications services providers now allow a subscriber to bill calling card charges to any of several commercial credit cards, such as Mastercard, Visa, Discover or American Express credit cards.

While traditional calling card service affords telephone subscribers the flexibility of making calls from locations other than their home or office, subscribes utilizing this service do not generally have the ability to budget for the call charges. Typical telecommunications service provider calling card accounts do not afford the subscriber the ability to set a limit on call charges. The credit limit, if any, on most calling card accounts usually is very high, representing the total credit worthiness of the subscriber. Most subscribers that subscribe to calling card service do not want their maximum credit limit on their card as the ordinary budget limit for telecommunication call charges.

As an alternative to traditional calling card service, telecommunication service providers such as AT&T now offer pre-paid telephone card service. A subscriber obtains pre-paid card service by purchasing a telephone card denominated in a currency amount representing a corresponding value (level) of service. The service provider issuing the card records the denominated amount in an account and typically prints the account number on the card, as well as a telephone number dialed to obtain the pre-paid service.

To obtain the pre-paid service, the subscriber dials the telephone number on the card whereupon, the telephone communications service provider prompts the subscriber to enter the pre-paid card account number. If the account number is valid, and the account has a sufficient balance, the telecommunications service provider then affords the subscriber the ability to place a telephone call to a called party. Upon establishing the call, the telecommunications service provider decrements the account balance in accordance with the running cost of the call. Should the account balance fall below a prescribed amount (representing a prescribed amount of call time, say one minute), the telecommunication service provider then warns the subscriber placing the call of the remaining call time. If the subscriber attempts to continue the call beyond the remaining call time, the telecommunications service provider terminates service. U.S. Pat. No. 4,706,275, issued Nov. 10, 1987, in the name of Zvi Kamil, purports to describe such a pre-paid card service.

Unlike traditional calling card service, pre-paid card service affords a subscriber the opportunity to budget for telecommunication call costs. A subscriber that wishes to spend only a certain sum for telecommunication costs can purchase one or more calling cards that collectively represent the budgeted amount for call costs. Unfortunately, traditional calling cards offer no flexibility in terms of exceeding the credit balance associated with the card. As discussed, telecommunications service providers offering traditional pre-paid calling card service invariably terminate a pre-paid card call once call cost exceeds the balance remaining on the pre-paid card. While the some pre-paid cards offer the subscriber an opportunity to replenish the card balance, the subscriber must do so during a separate call. Thus, with traditional pre-paid card service, subscribers run the risk of service termination once the pre-paid card account balance falls below the cumulative call cost.

Thus, there is need for a call billing mechanism that avoids the disadvantage associated with traditional calling call and pre-paid card service.

BRIEF SUMMARY OF THE INVENTION

Briefly, the present invention provides a combined calling card and pre-paid card service that allows for call budgeting, yet affords the flexibility to exceed a budgeted amount of service. A subscriber of the combined pre-paid and calling card service of the invention receives such service by placing a call to a telephone number maintained by a telecommunications service provider for the combined pre-paid and calling card service. Upon receipt of the call, the telecommunications service provider verifies the subscribers eligibility by prompting the subscriber to enter an account number that identifies the subscriber's pre-paid balance. In addition, the account number specifies an overflow indicator for the subscriber that determines whether the subscriber will receive manual or automatic overflow treatment for call charges that exceed the subscriber's pre-paid balance. If the subscriber is eligible, the telecommunications services provider provides the service while monitoring the cost of the call. Once the subscriber's pre-paid balance falls below a minimum level, the subscriber's overflow indicator determines the nature of the overflow treatment accorded the subscriber. Subscribers accorded automatic overflow treatment continue to receive service even after depletion of their pre-paid balance. For such subscribers, the telecommunications services provider bills "continuing" call charges (those exceeding the pre-balance) to the subscriber's account (either a calling card or major credit card account.) Subscribers accorded manual overflow treatment receive an announcement advising of them of the depletion of their pre-paid balance. At such time, a subscriber accorded manual overflow treatment receives a prompt offering options for continuing the call. For example, the subscriber may (1) continue the call by charging the cost to a calling card account or a separate credit card or, (2) replenish their pre-paid balance. If the subscriber accorded manual overflow treatment does nothing, the call terminates.

DETAILED DESCRIPTION

Figure 1:
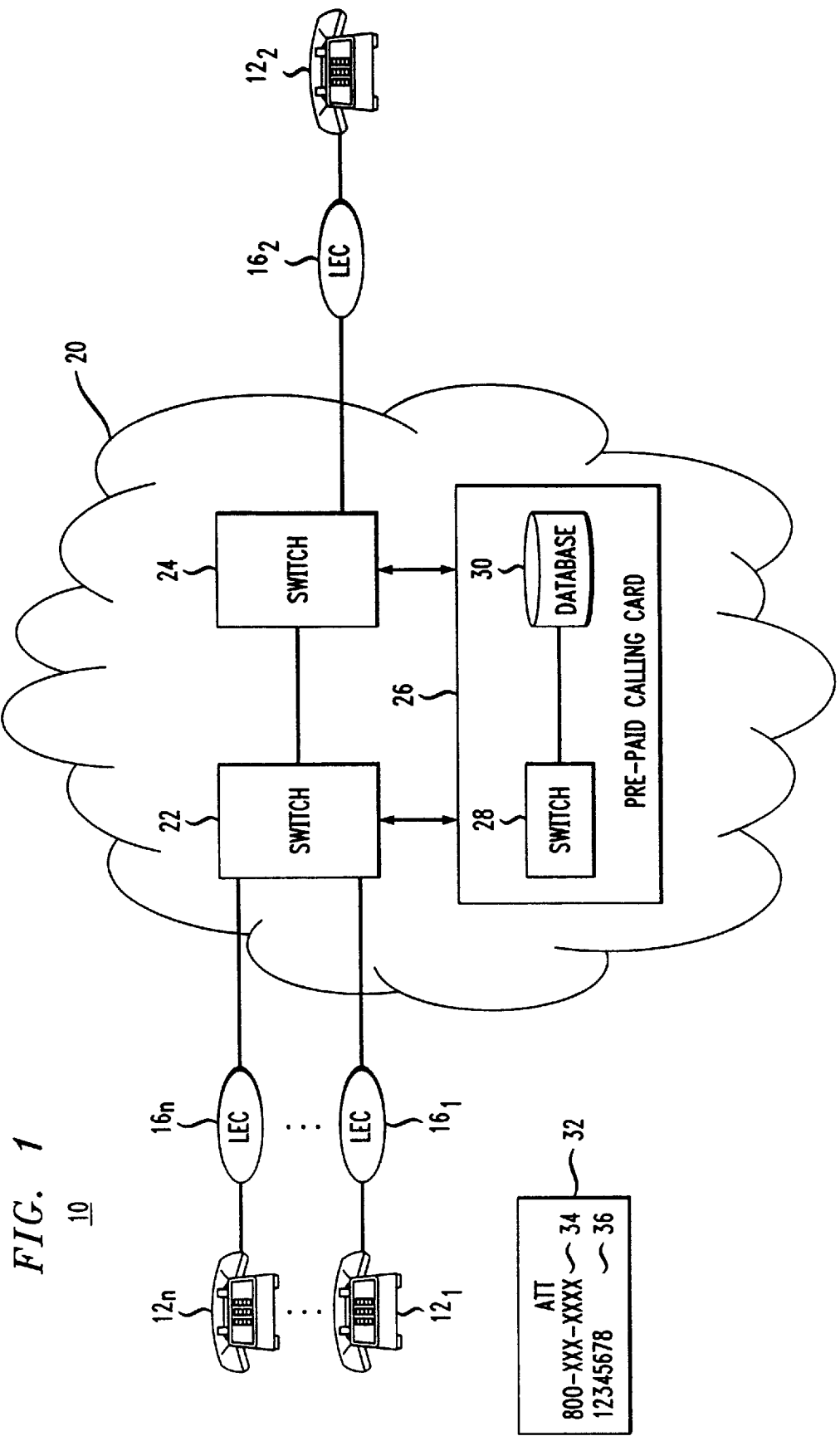
FIG. 1 depicts a block schematic diagram of a telecommunications network for practicing the combined pre-paid and calling card service of the invention.

FIG. 1 depicts a block schematic diagram of a telecommunications network 10 for providing the combined pre-paid and calling card service of the invention to one or more subscribers $12_1$, $12_2$ . . . $12_n$ (where i is an integer). In practice, the network 10 includes a plurality of Local Exchange Carriers (LEC) $16_1$, $16_2$ . . . $16_n$, each providing local service to a corresponding one of the subscribers. While FIG. 1 depicts a separate LEC for each subscriber, a single LEC may serve a plurality of individual subscribers.

Figure 2:
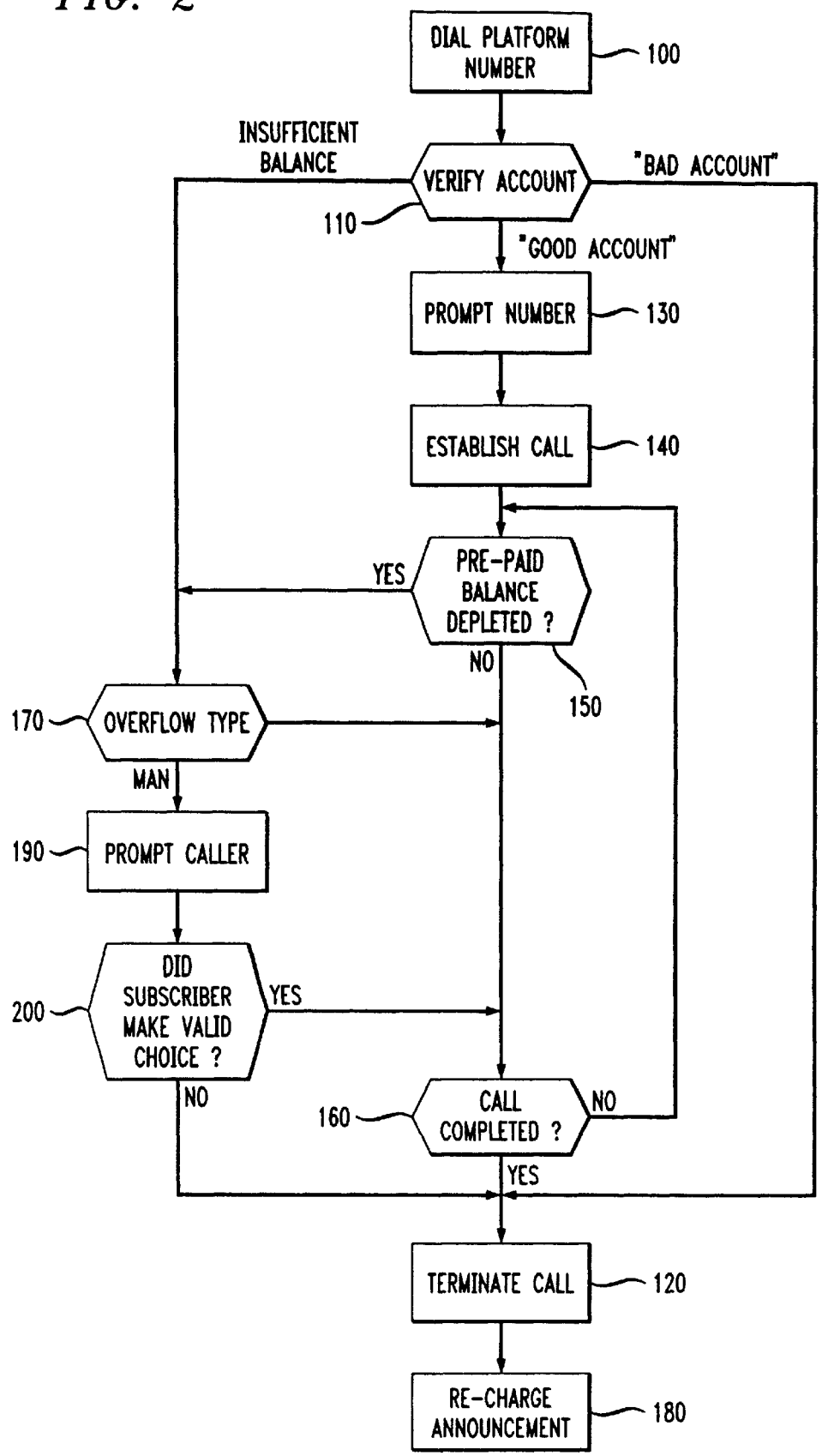
FIG. 2 depicts, in flow chart form, the manner in which a subscriber obtains the combined pre-paid and calling card service of the invention.

In the illustrated embodiment, the subscribers $12_1$–$12_n$ subscribing to the combined pre-paid and calling card service of the invention receive such service from an InterXchange Carrier (IXC) network 20, such as the network maintained AT&T. The network 20 includes at least one, and typically, a plurality of interconnected toll switches, represented by the switches 22 and 24, that are linked at least one LEC. (Although FIG. 2 depicts only the two toll switches 22 and 24 within the IXC network 20, the network may typically include a multiplicity of such switches.) Each toll switch, such as switch 22, that is linked to a LEC, such as LEC $16_1$, routes a call received from its associated LEC to another toll switch, say switch 24, within the network 20. The receiving toll switch (e.g., switch 24) routes the call to the destination LEC, (e.g., LEC $16_2$), either directly, if the switch serves that LEC, or through one or more via switches (not shown).

The network 20 also includes a signaling network (not shown) that links the toll switches 22 and 24. The signaling network carries signaling messages, such as call set-up messages, between the switches to facilitate the routing of calls through the network 20.

In accordance with the invention, the network 20 includes a platform 26 that provides the combined pre-paid and calling card service of the invention to those of the subscribers $12_1$–$12_n$ enrolled to receive to such service. The platform 26 may take the form of the pre-paid card service platform described in U.S. Pat. No. 5,353,335, issued on Oct. 4, 1994, in the name of Anthony D'Urso et al. (hereinafter incorporated by reference). Among the elements comprising the platform 26 are a switch 28 and a data base 30. As will be discussed below, the switch 28 receives and process calls made by the subscribers $12_1$–$12_n$ enrolled to receive the combined pre-paid and calling card service of the invention. In particular, the switch 28 verifies if the subscriber is eligible to receive the service by querying the database 30 that contains a record for each eligible subscriber. Additionally, the switch 28 serves to prompt the subscriber to enter certain information, as well as processing the subscriber-entered information to enable the subscriber to place a call through the network 20 to another subscriber. Additionally, the switch 28 monitors the running cost of the call and serves to alert the subscriber shortly before depletion of the subscriber's pre-paid balance.

To enjoy the combined pre-paid and calling card service of the invention, a subscriber, (e.g., subscriber $12_1$) acquires, typically by purchase, a pre-paid card 32 in a desired denomination corresponding to an equivalent amount of service. The card 32 bears a telephone number 34 that the subscriber dials to reach the platform 26 in the network 20. Typically, the number 34 comprises a toll free number (e.g., 800, 888 or now 877). In addition to the telephone number 34, the card 32 bears an account number 36 that corresponds to a data record in the database 30 that stores the subscriber's account balance and other information related to the subscriber. (Initially, the account balance corresponds to the denominated value on the card 32 but thereafter becomes depleted as the subscriber incurs call charges made using the card.)

The card 32 differs from a conventional pre-paid card, such as the type described in the aforementioned Kamil U.S. Pat. No. 4,706,275, in the following respect. With traditional pre-paid cards, the data record in the database 30 identified by the account number 36 only identifies the subscriber's pre-paid balance. In accordance with the invention, the account number 36 identifies the subscriber's pre-paid balance and also specifies a methodology ("overflow treatment") that affords the subscriber an opportunity to continue the call upon depletion of the pre-paid balance. As discussed, traditional pre-paid cards terminate the call upon the depletion of the subscriber's pre-paid balance. The combined pre-paid and calling card service of the invention affords subscribers the opportunity to continue the call in different ways, depending on the overflow treatment accorded the subscriber.

When the subscriber acquires the card 32, the subscriber elects either automatic or manual overflow treatment. By default, the subscriber receives manual overflow treatment if no treatment is selected. In selecting automatic overflow treatment, the subscriber authorizes the telecommunications service provider offering the combined pre-paid and calling card service to automatically bill the subscriber's account for call costs upon depletion of the pre-paid balance. For ease of discussion, the call costs incurred after depletion of the subscriber's pre-paid balance are hereinafter referred to as "continuing" call charges. For example, when selecting automatic overflow treatment, the subscriber may prearrange with the telecommunications services provider to bill the subscriber's calling card account, the subscriber's home telephone or the subscriber's office telephone for such "continuing" charges. Alternatively, the subscriber may prearrange with the telecommunications services provider offering the combined pre-paid and calling card service to bill the continuing call charges to a major credit card (e.g., VISA, Mastercard, Discover or American Express). To afford such automatic overflow treatment, the record in the database 30 identified by the subscriber's card account number 36 contains not only an indication of such treatment, but the account information needed to bill such continuing call charges.

When a subscriber elects manual overflow treatment (or makes no election at all, thereby obtaining manual overflow treatment by default), the record in the database 30 identified by the subscriber's account number 36 will so indicate. Indeed the account number 36 itself may directly indicate the overflow treatment, by virtue of the number of its digits or their value. Subscribers accorded manual overflow treatment do not enjoy automatic billing of continuing call charges. Rather, upon depletion of their pre-paid balance, subscribers accorded manual overflow treatment must manually elect such billing. As will be appreciated following a discussion of FIG. 2, subscribers electing manual overflow receive a prompt from the platform 26 shortly before depletion of their pre-paid balance asking the whether they wish to continue the call. If the subscriber elects to continue the call, then the subscriber must select a payment option (e.g., a calling card account or major credit card) for billing purposes. Failure to enter such information typically results in call termination.

Regardless of the type of overflow treatment, subscribers of the combined pre-paid and calling card service of the invention can elect to replenish their pre-paid balance during or after a call, or prior to a subsequent call. In practice, the platform 26 will notify the subscriber (via an announcement) of the depletion of their pre-paid balance shortly before actual depletion occurs. During the announcement, the platform 26 will prompt the subscriber to indicate whether he/she desires to replenish their pre-paid balance. If the subscriber so elects, then the platform 26 prompts the subscriber enter the necessary information (i.e., the telephone number, calling card account number or credit card number) for the cost of card replenishment. If the subscriber elects replenishment and enters the appropriate information, the switch 28 in the platform 26 will update the record in the database 30 to replenish the subscriber's pre-paid balance.

FIG. 2 depicts, in flow chart form, the steps associated with providing a subscriber with the combined pre-paid card and calling card service of the invention. A subscriber, having acquired the card 32 of FIG. 1, obtains service (step 100 of FIG. 2) by dialing the number 34 of FIG. 1 associated with the platform 26 of FIG. 1. Thereafter, the platform 26 of FIG. 1 verifies the subscribers account (step 110 of FIG. 2). The platform 26 verifies the account by prompting the subscriber to enter the account number 36 of FIG. 1. In addition, the platform 26 may prompt the subscriber to indicate the call destination (e.g., domestic or foreign), in order to determine whether the account is "good", "bad" or is "insufficient." A good account is one that is valid and has a sufficient pre-paid balance to entitle the subscriber to initiate a call. An account is "bad" if the account number is invalid. In accordance with the invention, a third possibility exists; the account is valid, but an insufficient balance exists. (Previously, an account with an insufficient balance, although valid, was deemed "bad.")

During step 110, the platform 26 of FIG. 1 verifies the subscriber's account by comparing the entered account number to a list of valid account numbers. If the subscriber-entered account number does not match a valid account number, the platform 26 of FIG. 1 deems the account "bad" and terminates the call (step 120 of FIG. 2.) Rather than terminate the call immediately, the platform 26 of FIG. 1 may prompt the caller to enter the account number again. If the subscriber does not enter a valid account number after a prescribed number of attempts, the platform 26 deems the account bad and terminates the call.

Should the platform 26 of FIG. 1 deem the account good, the platform executes step 130 of FIG. 2 and typically announces the subscribers current pre-paid balance and prompt the subscriber to enter the dialed number of the called party. Next, the platform 26 establishes (sets-up) the call between the subscriber and the called party (step 140). After establishing the call during step 140, the platform 26 periodically computes the call cost and checks whether the subscriber's pre-paid balance is depleted (step 150). After checking whether the pre-paid balance is depleted, the platform 26 checks whether the call is completed (step 160). If the call is completed, then the platform 26 terminates the call (step 160). Otherwise, the platform 26 again re-executes steps 150 and 160 and continues to do so periodically in succession until the pre-paid balance is depleted or the call is completed.

Upon detecting a depleted pre-paid balance during step 150, or upon detecting an insufficient balance during step 110, the platform 26 of FIG. 1 executes step 170 of FIG. 2 and checks the overflow treatment accorded the subscriber. The subscriber's data record stored in the database 30 of FIG. 1 indicates whether the subscriber has indeed chosen manual or automatic treatment. (If the subscriber selected no treatment, the subscriber receives manual overflow treatment by default.) Following step 170, the platform 26 of FIG. 1 executes step 160 for subscribers accorded automatic overflow treatment. In this way, a subscriber selecting automatic overflow treatment can continue a call, with the charges now billed to the subscriber's telephone number, calling card account or major credit card. Although not shown, subscribers accorded automatic overflow treatment could receive an announcement after step 170, alerting them of the automatic "toggling" of their service from pre-paid to calling card.

Subscribers that enjoy automatic overflow treatment typically receive an announcement (step 180) after call termination (step 120) affording them the option to replenish their pre-paid balance or continue using their card as a calling card. If the subscriber hangs up during step 180 rather than make a selection, then the subscriber will typically receive a similar message during step 110 upon a subsequent call to the platform 26.

Following step 170, subscribers accorded manual overflow treatment receive a prompt during step 190. The prompt requests the subscriber to indicate whether continue the call as a calling card or credit card call or if the subscriber wishes to replenish his/her pre-paid balance (by charging the cost to a telephone number, calling card or credit card.). Next during step 200, the platform checks whether the subscriber entered a valid response to the prompt made during step 190. Upon determining that the subscriber made a valid choice during step 200, the platform 26 executes step 160. If the subscriber elected to continue using the card as a calling card, the platform 26 would bill continuing charges to the subscriber's calling card account, telephone number, or major credit card. Like subscribers accorded automatic overflow treatment, subscribers accorded manual overflow treatment could have the option to replenish their pre-paid balance or continue using their card as a calling card. If subscriber makes no entry during step 200, the platform 26 terminates the call.

The foregoing describes a combined pre-paid and calling card service that affords subscribers the ability to continue a call as a calling or credit card call upon expiration of their pre-paid balance, either automatically, or manually.

It is to be understood that the above-described embodiments are merely illustrative of the principles of the invention. Various modifications and changes may be made thereto by those skilled in the art, which will embody the principles of the invention and fall within the spirit and scope thereof.

What is claimed is:

1. A method for providing combined pre-paid and calling card telecommunications service, comprising the steps of:

receiving within a telecommunications network a call initiated by a subscriber seeking combined pre-paid and calling card service;

verifying the subscriber's eligibility, and if the subscriber is eligible, then, providing the subscriber with service while decrementing a cost for such service from a pre-paid balance associated with the subscriber; while determining if the subscriber's pre-paid balance is depleted below a prescribed value, and if so, determining whether a subscriber is to be accorded manual or automatic overflow treatment for billing for continuing service once the subscriber's pre-paid balance falls below the prescribed value; and effecting continuing service and billing for such continuing service when effected in accordance with the overflow treatment accorded the subscriber.

2. The method according to claim 1 wherein the step of providing continuing service and billing for such continuing service includes the step of automatically continuing service costs to a subscriber-selected account for subscribers determined to receive automatic overflow treatment.

3. The method according to claim 2 wherein the continuing service costs are billed a subscriber-selected calling card account.

4. The method according to claim 2 wherein the continuing service costs are billed a subscriber-selected telephone number.

5. The method according to claim 2 wherein the continuing service costs are billed a subscriber-selected major credit card.

6. The method according to claim 1 wherein the step of providing continuing service and billing for such continuing service includes the steps of:

prompting the subscriber to enter billing information for billing continuing service costs;

verifying the subscriber-entered billing information; and discontinuing service if the subscriber-entered information is improper.

7. The method according to claim 6 wherein the continuing service costs are billed a subscriber-selected calling card account.

8. The method according to claim 6 wherein the continuing service costs are billed a subscriber-selected telephone number.

9. The method according to claim 6 wherein the continuing service costs are billed a subscriber-selected major credit card.

10. The method according to claim 1 wherein the billing step includes providing the subscriber the option to replenish the subscriber's pre-paid balance and replenishing the balance when the subscribed selects such option.

11. The method according to claim 10 including the step of charging a telephone number for the cost of replenishment.

12. The method according to claim 10 including the step of charging a calling card for the cost of replenishment.

13. The method according to claim 10 including the step of charging a major credit card for the cost of replenishment.

14. The method according to claim 1 wherein the verifying step includes the steps of:

prompting the subscriber to enter an account number; and matching the account number against a list of valid account numbers.

15. The method according to claim 14 wherein the step of determining whether the subscriber is accorded manual or automatic overflow treatment includes the step of retrieving a data record corresponding to the account number, the data record containing an indication of the overflow treatment accorded to the subscriber.

16. The method according to claim 14 wherein the step of determining whether the subscriber is accorded manual or automatic overflow treatment includes the step of examining the account number for a characteristic indicative of the overflow treatment.

17. A telephone network for providing combined pre-paid and calling card telecommunications service, comprising the steps of:

telephone switch means for receiving a call initiated by a subscriber seeking combined pre-paid and calling card service;

a database coupled to the switch containing data records for subscribers enrolled to receive the combined pre-paid and calling card service, each data record including a pre-paid balance value indicative of the subscriber's pre-paid balance and an indication of whether the subscriber is accorded manual or overflow treatment for billing continuing services costs once the subscriber's pre-paid balance is depleted below a prescribed value, the switch means verifying the subscriber's eligibility, and if the subscriber is eligible, then providing the subscriber with service while decrementing a cost for such service from a pre-paid balance associated with the subscriber while determining if the subscriber's pre-paid balance is below a prescribed value, and if so determining whether a subscriber is to be accorded manual or automatic overflow treatment for billing for continuing service once the subscriber's pre-paid balance falls below the prescribed value; and providing continuing service and billing such continuing service in accordance with the overflow treatment accorded the subscriber.

* * * * *